United States Patent [19]

Wahls

[11] Patent Number: 5,408,756

[45] Date of Patent: Apr. 25, 1995

[54] BIFOLD FIELD MARKER

[75] Inventor: Stephen L. Wahls, Lexington, Nebr.

[73] Assignee: Orthman Manufacturing, Inc., Lexington, Nebr.

[21] Appl. No.: 149,637

[22] Filed: Nov. 9, 1993

[51] Int. Cl.$^6$ .................... A01B 69/02; A01B 73/02
[52] U.S. Cl. ........................ 33/624; 33/1 H; 172/126
[58] Field of Search .......... 33/624, 264, 1 H; 172/126, 132, 128, 430

[56] References Cited

U.S. PATENT DOCUMENTS

| | | | |
|---|---|---|---|
| 4,526,235 | 7/1985 | Kinzenbaw | 172/126 |
| 4,529,040 | 7/1985 | Grollimund | 172/126 |
| 4,530,405 | 7/1985 | White | 172/126 |
| 4,674,578 | 6/1987 | Bexten et al. | 172/126 |
| 4,825,957 | 5/1989 | White et al. | 172/126 |
| 4,986,367 | 1/1991 | Kinzenbaw | 172/126 |
| 5,027,525 | 7/1991 | Haukaas | |

Primary Examiner—Christopher W. Fulton
Attorney, Agent, or Firm—Zarley, McKee, Thomte, Voorhees, & Sease

[57] ABSTRACT

The present invention is a bifold field marker. The marker utilizes a marking disc mounted on the distal end of an arm. This arm is coupled to a mounting bracket which, in turn, is connected to an implement's tool bar. The arm is articulated at a central knuckle to allow the marker to fold. A hydraulic cylinder is positioned between the mounting bracket and the arm to push or pull the arm about a main pin or hinge. The main pin or hinge on the mounting bracket is oriented at a 45 degree angle in both the horizontal and vertical planes. This allows the hydraulic cylinder to pivot the arm about the 45 degree axis and fold the arm simultaneously until the marker is positioned in a compact orientation along the side of the implement.

4 Claims, 3 Drawing Sheets

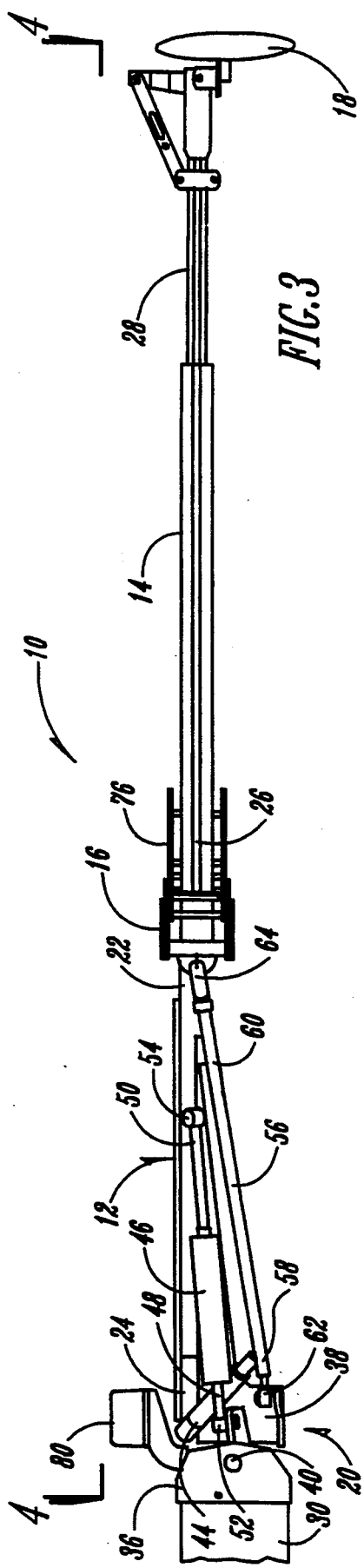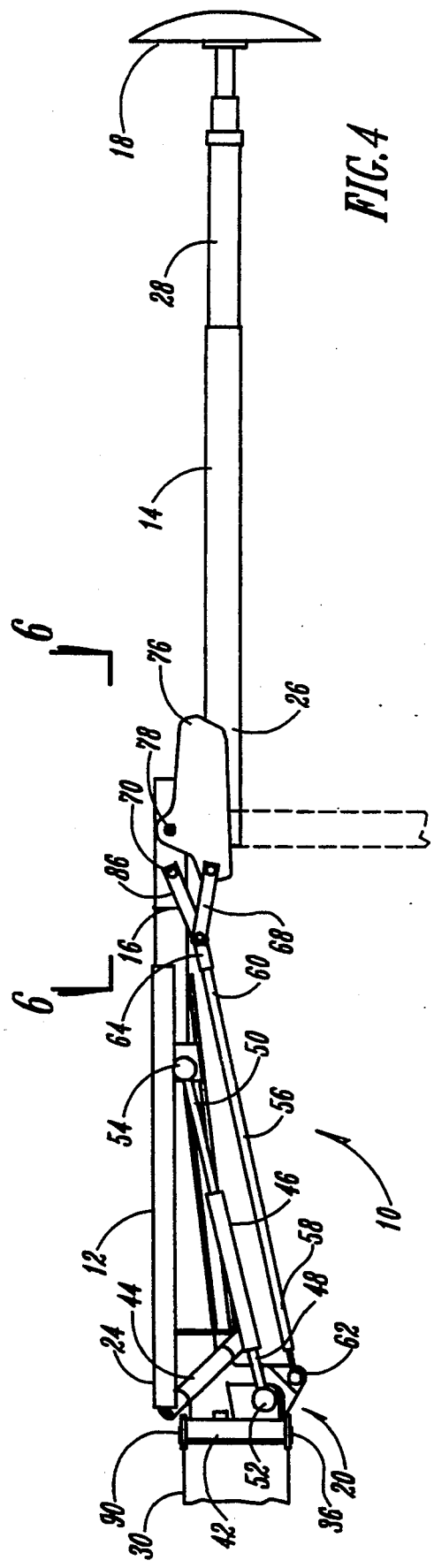

BIFOLD FIELD MARKER

BACKGROUND OF THE INVENTION

This invention relates to a field marker for mounting on an agricultural implement for scoring a line in the ground for gauging the distance of subsequent passes in a field.

Various types of field markers are provided in the prior art. One class of marker, known as a disc marker, includes a disc which is carried on the distal end of an extendible arm. When the arm is in a field working position, the disc contacts the ground and scores the earth sufficient for the operator of the farm implement to which it is coupled to follow the path of the previous scoring pass.

Generally, such disc markers includes a mounting assembly which attaches the marker to a farm implement and an arm which is pivotally mounted about an axis along the side of the implement so that the arm can adjust to the varying heights of the ground on which the implement operates. Early in the prior art, the marker was moved into a retracted or transport position by lifting the disc and arm about the pivot axis to a raised position. These simple types of markers often were too long and unintentionally encountered trees and fence rows. If the markers were lifted, they may have even contacted powerlines with fatal results.

Recently, bifold field markers have been developed that have a second axis allowing the marker to fold in half, thus enabling the device to be folded in a more effective and compact manner. These markers were often heavy, expensive, and lacked the ability to adjust to the contours of the ground during operation. Some versions drag along the ground excessively while they are being folded. Those that overly compensate for this problem have difficulty with the downward float of the marker. Further, when these markers fold, they often are difficult to control and flail uncontrollably. Some models require restrictors in their hydraulic hoses to provide for a more docile operation.

For example, U.S. Pat. No. 5,027,525, issued to Haukaas, shows a field marker which can be wing folded. The Haukaas patent discloses a disc marker which folds in an elbow-like fashion and, in its folded position, the distal section of the arm rests alongside the proximal section of the arm through a series of springs, cables and pulleys. Unfortunately, the Haukaas markers requires a shock absorber to stabilize the marker in operation. Further, the Haukaas marker requires a biasing means for regulation of the downward momentum of the marker.

SUMMARY OF THE INVENTION

Therefore, a primary object of the present invention is the provision of an improved bifold field marker.

A further object of the present invention is to provide a field marker which is stable through the folding process between a working or field position and a retracted or transport position.

A further object of the present invention is the provision of an improved field marker which has a minimum folded size and which will avoid obstructions during transport.

Another object of the present invention is the provision of an improved field marker which reduces the number of linkages required for effective operation.

Another object of the present invention is the provision of an improved field marker which minimizes its height during the folding process.

A further object of the present invention is the provision of an improved field marker which remains in control and stable during operation, folding, and transport.

A still further object of the present invention is the provision of an improved field marker which is economical, efficient in use, and which results in a durable assembly.

The present invention utilizes a marking disc mounted on the distal end of a distal arm. This distal arm is coupled to the proximal arm by a folding linkage system. The proximal arm is connected to the mounting bracket which, in turn, is connected to the implement's tool bar. A hydraulic cylinder extends from the mounting bracket to the proximal arm to push or pull the proximal arm about the main pin or hinge. As the proximal arm is rotated about the main pin or hinge, a four bar linkage causes the distal arm to retract if the cylinder retracts, or the distal arm will extend if the cylinder expands.

The main pin or hinge on the mounting bracket is oriented at a 45 degree angle in both the horizontal and vertical planes. This allows a simple hydraulic cylinder to fold the proximal arm and distal arm into an orientation where the distal arms rests on top of the proximal arm along side of the implement.

DESCRIPTION OF THE DRAWINGS

FIG. 3 is an isolated rear elevational view of the present invention in the field or working position.

FIG. 4 is an isolated top plan view of the present invention in the field or working position.

DETAILED DESCRIPTION OF THE PREFERRED EMBODIMENT

Figure 1:
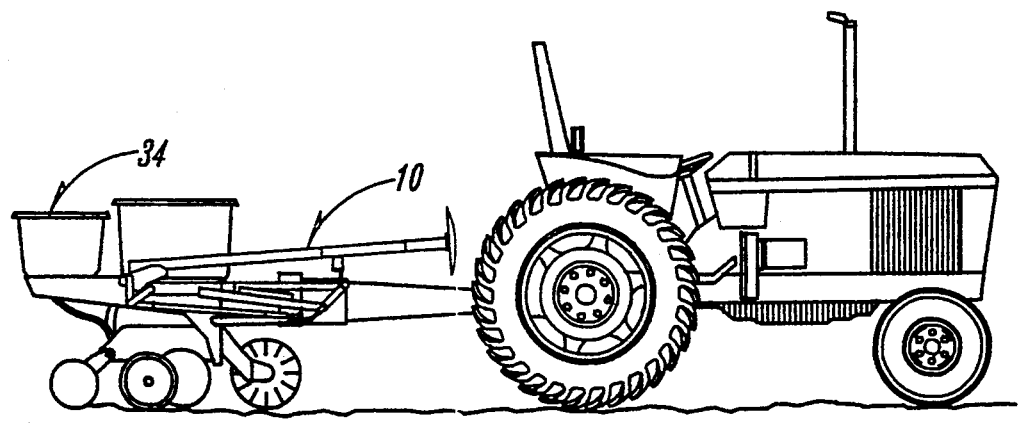
FIG. 1 is a side elevational view of a farm implement which would typically utilize the present invention.

Referring to the drawings, numeral 10 generally refers to a bifold field marker of the present invention which comprises a first stage arm 12, a second stage arm 14, a four bar linkage 16 connecting the distal end 22 of the first stage arm 12 and the proximal end 26 of the second stage arm 14, a marking disc 18 operatively mounted on the distal end 28 of the second stage arm 14, and a mounting bracket 20 located at the proximal end 24 of the first stage arm 12.

As best shown in FIG. 4, the marker 10 extends from a tool bar 30 of a farm implement 34. The mounting bracket 20 is bolted or welded to the tool bar 30. Attachment can be accomplished using bolts, clamps, welds or other means known in the art. The mounting bracket 20 consists generally of two sections, the bracket 36 which is mounted directly on the tool bar 30, and a base plate 38 which is connected to the bracket 36 and pivots about a horizontal pivot pin 40. The pin 40 is encased in a horizontal bushing 42 and allowed to rotate freely about its horizontal axis. The amount of pivot about the pin may be limited by a set screw positioned between the base plate 38 and the bracket 36. During operation, when the marker 10 is in a fully extended position and the disc 18 engages the ground, this horizontal pivot 40 allows the marker 10 to float or adjust to the contours of the ground.

The base plate 38 is connected to the first stage arm 12 by hinge 44. The hinge 44 is oriented at a 45 degree angle from both the vertical and horizontal planes. While the hinge may be placed in an angle in the range of 35 to 55 degrees, a 45 degree angle is believed to provide optimum results. The main pivot shaft extends through the hinge 44 allowing the first stage arm 12 to pivot about a skewed axis axial to hinge 44. The first stage arm 12 extends between the hinge 44 and the four bar linkage assembly 16. The hydraulic cylinder 46 extends between the base plate 38 and the first stage arm 12 and is connected at its proximal and distal ends 48, 50 by ball joints 52, 54, respectively. A secondary truss 56 extends between the base plate 38 and the four bar linkage 16. The proximal end 58 of the truss 56 is connected at the base plate 38 by a ball joint 62. The distal end 60 of the truss 56 is connected to the linkage 16 by a hinge 64 pivotable about a vertical axis in field operating position and horizontal axis in transport position.

The four bar linkage 16 is comprised of a first member 66 and a second member 68. The first member 66 extends between hinge 64 and the first stage arm 12. The second member 68 extends between the hinge 64 and the second stage arm 14. The first member 66 is pivotally connected at pivot pin 70 on first stage arm 12 while the second member is pivotally connected on the second stage arm 14 at pivot pin 72.

The second stage arm 14 is connected at its proximal end to linkage 16 by pivot pin 72 and vertical hinge 78 located on the first stage arm 12. The marking disc 18 or other apparatus is operatively connected at the distal end 22 of the second stage arm 14. The second stage arm 14 is designed to break away if an obstruction is encountered in the field. A plurality of properly sized bolts are located within the knuckle 76 of the second stage arm 14. Two ¼" bolts should provide sufficient strength, but 5/16" bolts may be required. Should an obstruction be encountered, the bolts will break and the second stage arm 14 will pivot about pivot pin 72. However, this will occur only when a strong shear force is encountered by the second stage arm 14.

Figure 5:
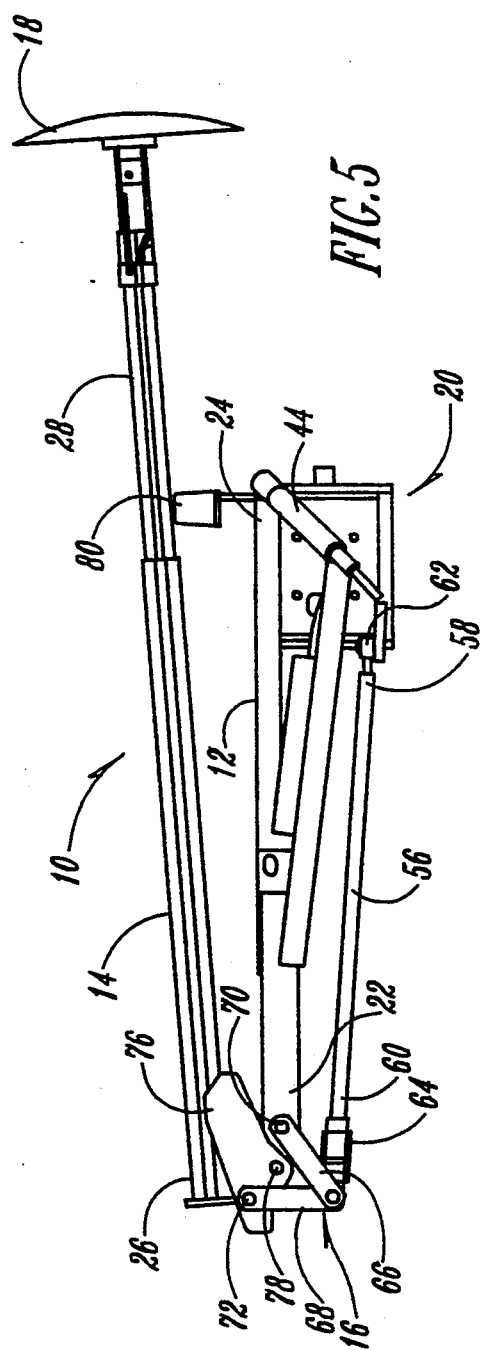
FIG. 5 is an isolated side elevational view of the present invention in the transport position.
Figure 6:
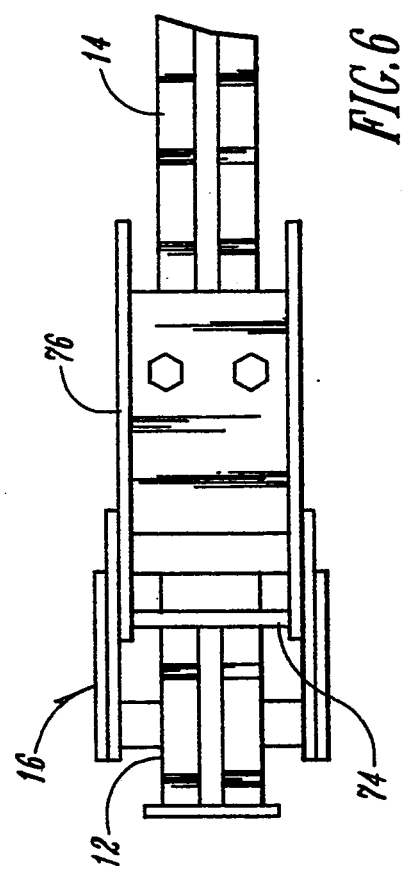
FIG. 6 is an is dated front elevational view of the break away hinge in FIG. 4.

As shown in FIG. 3, the marker 10 is in its extended or field working position. The marker 10 is shown in its transport position in FIG. 5. In folding operation, the hydraulic cylinder 46 causes the first stage arm 12 to pivot about the main pivot shaft 44. This causes the first stage arm 12 to be simultaneously lifted and swept back toward the rear of the farm implement 34. As the distance between ball joints 52, 54 is changed, the truss 56 and linkage 16 rotates the second stage arm 14 about secondary hinge 78 causing the second stage arm 14 to fold. Eventually, the secondary stage arm 14 becomes situated on rest 80 which is coupled to the bracket 36. The entire marker 10 is now folded and out of the way as shown in FIG. 5. In operation, hinge 64, aligned vertically in the field operating position, is rotated until it lies horizontally in the transport position.

Figure 2:
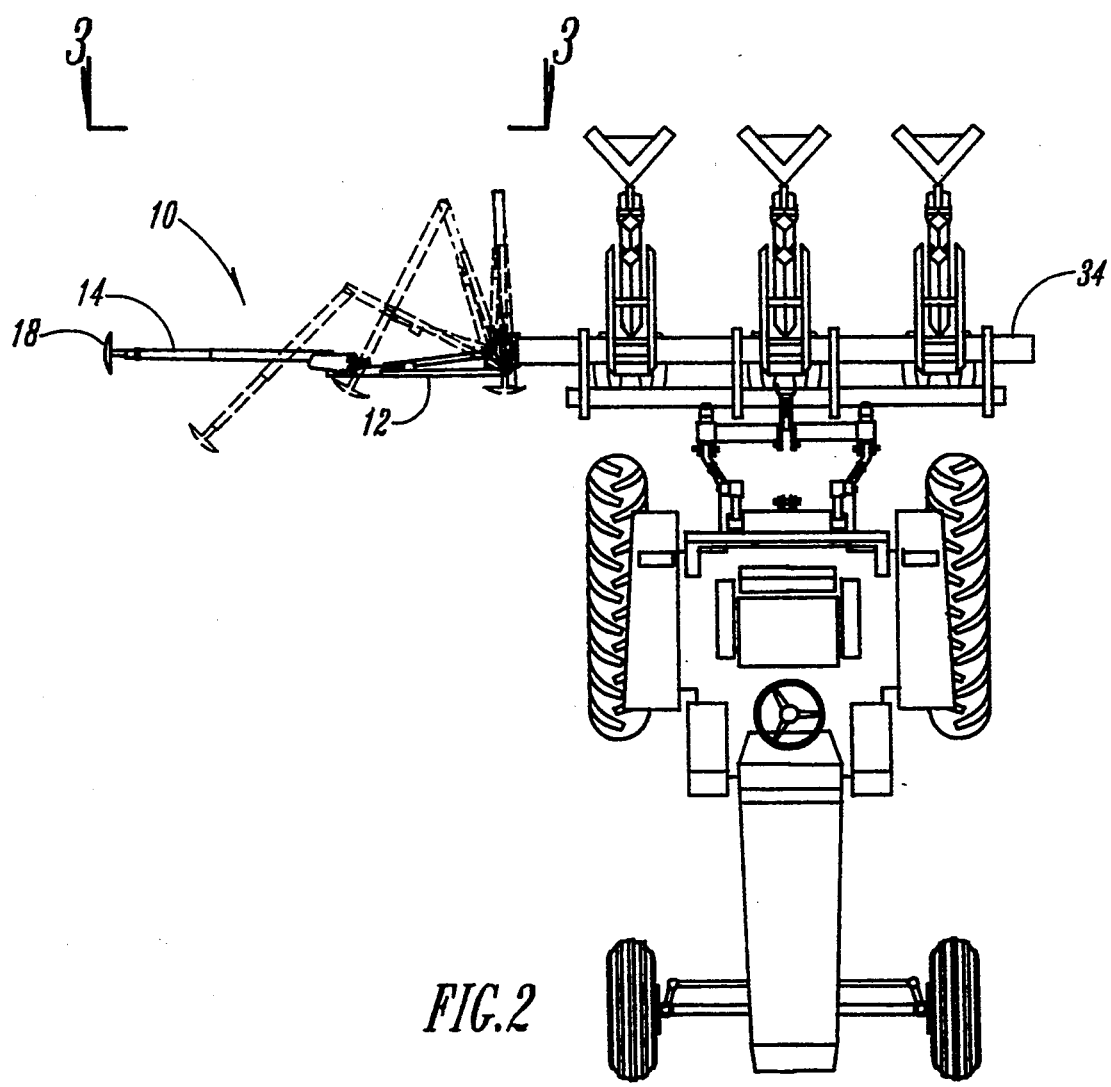
FIG. 2 is a plan view showing the operation of the present invention.

In the final transport position, the marker 10 can easily be transported as shown in FIG. 1. FIG. 2 shows how a marker 10 placed on the side of an implement 34 travels from its fully extended or field working position to its transport position.

It is to be understood that the marker 10 is of a sufficient length to provide a mark at a required position relative to the side of the implement 34 and the arm can be fully retracted to a position where it will not interfere with the movement of the implement 34 and remain in a stationary position until activated. The marker shown and described is arranged for use on the right hand side of the implement 34. It is to be understood that a corresponding structure could be placed on the opposite side.

In the drawings and specification there has been set forth a preferred embodiment of the invention, and although specific terms are employed, these are used in a generic and descriptive sense only, and not for the purposes of limitation. Changes in the form and the proportion of parts as well as in the substitution of equivalents are contemplated as circumstances may suggest or render expedient without departing from the spirit or scope of the invention as defined in the following claims.

I claim:

1. A bifold field marker for a farm implement having a toolbar comprising:
   a mounting bracket attached to the tool bar of the farm implement;
   a main pivot shaft connected to the mounting bracket offset approximately 35 to 55 degrees;
   an arm having a first section and a second section, the first section being coupled to the main pivot shaft and supported for pivotal movement about the main pivot shaft between a first extended position wherein the first section and second section are substantially co-linear and a second transport position wherein the first section and the second section are folded adjacent each other, the second section being connected to the first section and supported for pivotal movement about a secondary shaft between the first extended position and the second transport position;
   ground marking means attached to the second section for marking a path in the ground when the marker is in the first extended position; and
   hydraulic power means for moving the arm between the first extended position and the second transport position.

2. The bifold field marker of claim 1 wherein the main shaft is oriented at approximately a 45 degree angle.

3. A bifold field marker for mounting to an agricultural implement for creating a scored line on the ground parallel to a direction of implement travel, comprising:
   an arm having an inner end for mounting onto the implement and an outer end for projecting outwardly from the implement;
   means for marking the ground disposed on the outer end of the arm;
   mounting means coupled to the inner end of the arm and mounted on the implement, the mounting means being oriented at an angle approximately 35 to 55 degrees from normal;
   power means for moving the arm between an extended position wherein the means for marking the ground is engaged and a transport position wherein the arm is parallel to the direction of the implements travel;
   articulating means positioned between the inner end and outer end of the arm for folding the arm so that the outer end rests adjacent the inner end of the arm when in the transport position; and
   means for supporting the outer end of the arm while in the transport position.

4. The bifold field marker of claim 3 wherein the mounting means is oriented at approximately a 45 degree angle.

* * * * *